United States Patent [19]
Morgan

[11] Patent Number: 5,249,412
[45] Date of Patent: Oct. 5, 1993

[54] MECHANICAL FRUIT PICKER WITH DELIVERY SYSTEM

[76] Inventor: Bob Morgan, P.O. Box 23, Grantsville, W. Va. 26147

[21] Appl. No.: 864,900

[22] Filed: Apr. 2, 1992

[51] Int. Cl.$^5$ .................... A01D 46/00; A01D 46/22; A01D 46/24
[52] U.S. Cl. .................................................. 56/334
[58] Field of Search ................ 56/332, 333, 334, 335, 56/336, 330

[56] References Cited

U.S. PATENT DOCUMENTS

| | | | |
|---|---|---|---|
| 240,422 | 4/1881 | Jackson | 56/333 |
| 467,687 | 1/1892 | Matlock | 56/333 |
| 1,034,333 | 7/1912 | Arnold | 56/334 |
| 1,825,601 | 9/1931 | Palmbush | 56/334 |
| 2,990,669 | 7/1961 | Klemm, Jr. | 56/334 |
| 3,572,021 | 3/1971 | McDonald | 56/334 |
| 4,098,062 | 7/1978 | Gaubis | 56/334 |

*Primary Examiner*—Stephen J. Novosad

[57] ABSTRACT

This mechanical fruit picker is composed of a housing, (9, 11, 12, 16, 17), it has two jaws mounted on the top perimeter of the said housing (5, 6). They are mounted in such a manner that one passes through the other in the process of opening and closing. This is accomplished by them being hinged a small distance apart (8). A control rod (20) activated through a bracket (18) with a ring provided on the top end that encloses the sides of the jaws (10) is energized by a spring (15) to open and close the jaws. A cord (32) attached to the bottom of this rod takes the jaws down with a light pull. When released they snap shut. The ring then holds them shut until it is again pulled to gather another fruit. The fruit as it is engaged passes down through the housing into a flexible sleeve (25, 26) to the operator. A snap-on cap (22-24) of flexible material is also provided if only a few fruit are desired. The object of this picker is to accomplish the needs of orchardists that have been looking forward to a better method of harvesting fruit with less effort and damage.

1 Claim, 2 Drawing Sheets

MECHANICAL FRUIT PICKER WITH DELIVERY SYSTEM

BACKGROUND—FIELD OF INVENTION

This invention relates to a mechanical fruit picker with the capability of removing fruit and delivering it to the individual operator, or an optional closure to adapt it to a take-down method when only a few fruit are to be gathered.

BACKGROUND—DESCRIPTION OF PRIOR ART

Hardware stores as well as nurseries commonly supply orchardists with fruit pickers with a number of wire-like fingers, shaped hook-like, which converge to form a wire enclosure under the said finger-like tines to catch the fruit; said enclosure having a capacity of about five medium size apples. This device is mounted on a pole. For extreme heights it will probably be sectional. In this case the individual will have to do a hand-over-hand job on the pole to get the fruit down. The fruit is collected by a swatting action, or side motion of the picker in many cases resulting in twigs that hold other fruit being separated and fall to the ground in a damaged condition as well as puncturing other fruit. The operator must bear the weight of the picker, fruit and pole, while using extreme caution not to lose the fruit while doing so. In years past orchardists have devised their own methods of picking fruit which usually consisted of a ring with a cap device with a "V" shaped notch in the hoop to engage the fruit and a pole for a handle that fit a curved ferule at the top. A recent publication shows a similar picker with two converging removable blades on this "V" like projection which is objectionable because it improperly removes the fruit, none of which relates to my mechanical fruit picker because they are totally different. They are not mechanical and also not operated with jaws to remove the fruit with a delivery system. None of the above methods have any evidence of being patented unless it is the cutter blades on the latter.

OBJECTS AND ADVANTAGES

Accordingly, besides the objects and advantages of the present invention are:

(a) to provide a mechanical fruit picker that can pick fruit with a minimal effort.

(b) to provide a mechanical fruit picker that also delivers the fruit by gravity.

(c) to provide a mechanical fruit picker that does not have to be taken down to deliver the fruit.

(d) to provide a mechanical fruit picker that can be operated by elderly persons, children, or a person in a wheelchair, by holding the picker at waist level.

(e) to provide a mechanical fruit picker that only causes a minimal damage to the fruit.

(f) to provide a mechanical fruit picker with minimal damage to the parent tree.

(g) to provide a mechanical fruit picker with less interference from twigs and branches of the tree.

(h) to provide a mechanical fruit picker that is a sure-fired deliverer when it closes on the fruit.

(i) to provide a picker with definite sight advantages.

(j) to provide a picker that eliminates the hazards of a stepladder.

(k) to provide a picker of durable material that is long lasting.

(l) to provide a picker that has its operating means available at any level on the handle.

Figures 1, 2:
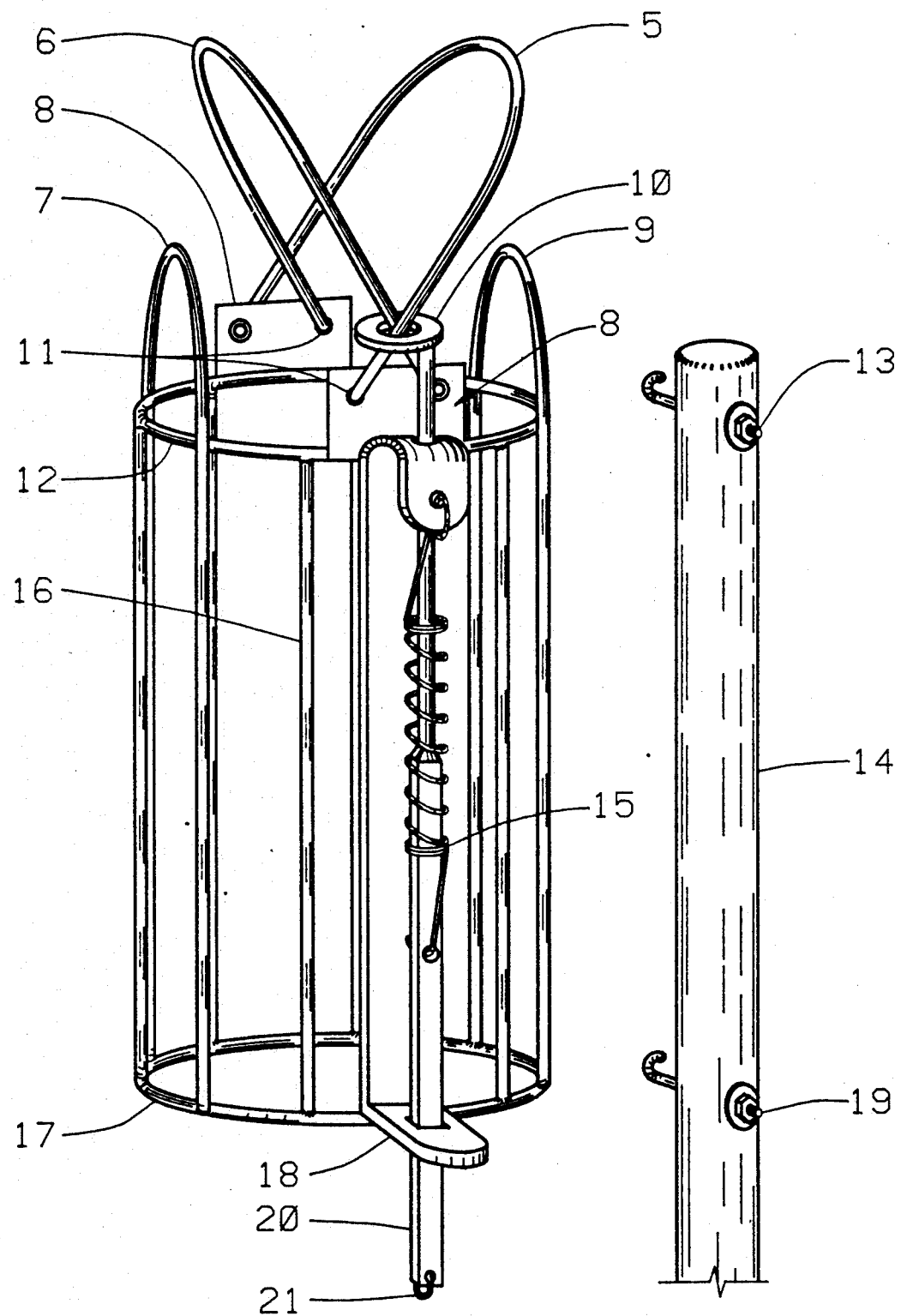
FIG. 1 shows the main embodiment of the picker with delivery and containment parts not shown.
FIGS. 2 and 4 show the upper and lower portions, respectively, of the picker pole handle of the invention.
Figure 3:
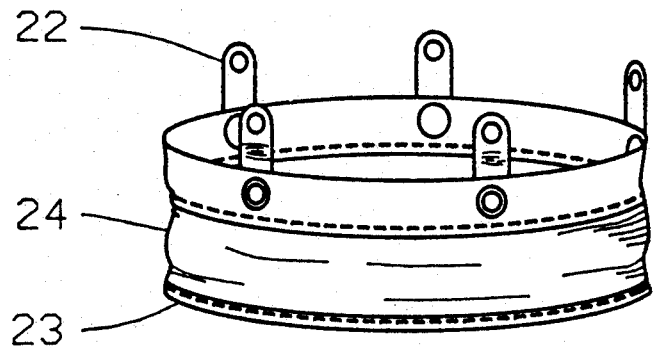
FIG. 3 shows a bottom perimeter cap for special uses.
Figure 5:
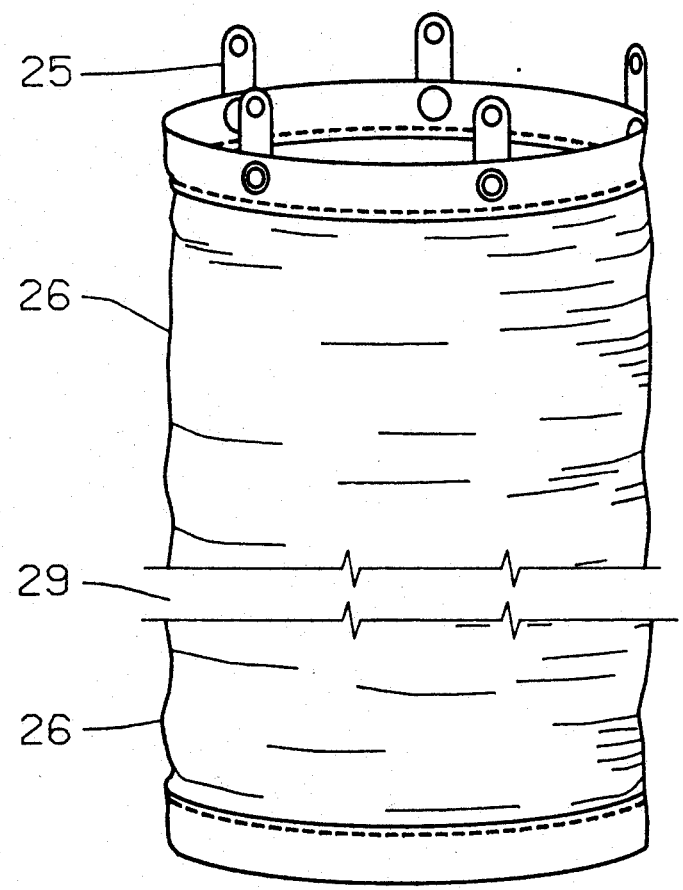
FIG. 5 shows a picker tube for delivery of fruit by gravity.
Figure 4:
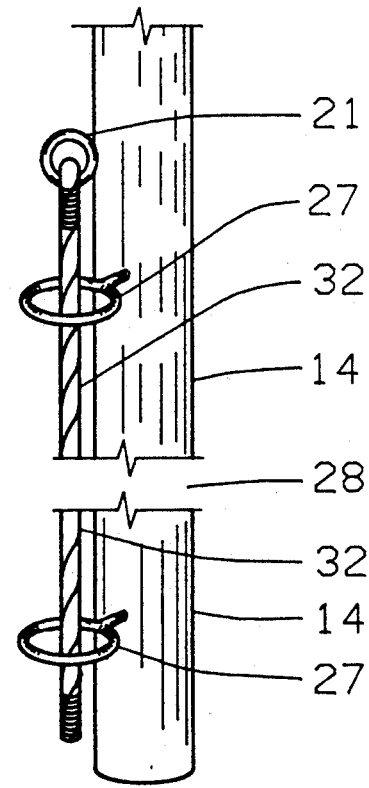

| Reference Numerals In Drawings |
| --- |
| 5 outside jaw |
| 6 inside jaw |
| 7 fruit shield |
| 8 brackets with jaw aperture |
| 9 fruit shield |
| 10 ring attached to control rod |
| 11 aperture in bracket |
| 12 top hoop |
| 13 J bolt |
| 14 pole handle |
| 15 spring |
| 16 rods |
| 17 bottom hoop |
| 18 bracket |
| 19 J bolt |
| 20 control rod |
| 21 key ring to attached cord |
| 22 snap fasteners |
| 23 cap bottom |
| 24 side of cap |
| 25 snap fasteners |
| 26 side of delivery tube |
| 27 eye screw |
| 28 indicates part not shown |
| 29 indicates part not shown |
| 30 top of bracket with apertures |

DETAILED DESCRIPTION—FIGS. 1-5

A tubular housing having a top and bottom end, with both open, with sufficient length and breadth to accommodate the fruit and attachments. A top and bottom hoop 12 and 17 are provided as a means of constructing said housing. A plurality of rods 16 with two ends are attached to the bottom and top hoops to constitute the sides. Two of said rods on each side extended above the top perimeter to form arch shaped fruit shields 7 and 9 directly opposed to each other. Numerals 5 and 6 show two "U" shaped jaws having two legs, one of said jaws smaller than the other to fit snuggly inside the larger. Numeral 6 shows the smaller jaw with the ends bent outward for engagement at 90°. Numeral 5 shows the same procedure for the larger jaw with the ends bent in the reverse to serve as hinge pins.

Two rectangular attachments are mounted on the top perimeter of the housing directly opposing each other 8 centrally located between the fruit shields 7 and 9 with two holes 11 to accommodate the jaws. The said holes are spaced horizontally from each other ⅜" apart to allow the jaws 5 and 6 to open and close when actuated in a scissor-like motion.

A bracket 18 of thin, flat metal compatible with the length of the housing having two ends, is attached to the housing parallel with the housing in close proximity of one of the jaw attachments 8, specifically in a center position of the said attachment. The upper end is prebent, hookshaped and the lower "L" shaped in an outward direction at 90°. A slot in the bend of the uppermost end is provided, and a small hole for a spring attachment. The lower end is provided with a square hole for a control rod 20.

The control rod consists of a rod with two ends about 2" longer than aforesaid bracket with a ring attached at the upper end at 90° to fit loosely around one side of both jaws 5 and 6. An aperture for the lower end of the spring is provided 31. Also one at the very lower end of the rod for a miniature key ring for a cord attachment to actuate the control rod. The portion of the control rod that actuates through the square hole in the bracket must be flattened and fit snuggly to avoid tilt or the entire rod can be square with apertures shaped accordingly.

To assemble the control rod is started through the slit in the bracket, a light tension spring is threaded on as it continues through the square hole at the bottom with the ring of the control rod pointing toward the center of the housing. To assemble the jaws are placed with one end of each through the ring of the control rod and hooked in the apertures provided for them, and the other ends hooked in the aperture of the opposite side. The spring is attached to the opening provided for it. A cloth sleeve with snaps or other means attached to the bottom of the housing delivers the fruit, and a pole is attached as a handle for extended reach. A cord attached to the bottom of the control rod actuates the jaws. The jaws act in unison to remove the fruit in scissor-like manner. The jaws remain closed. A light pull on the cord opens them, and its release lets it close around the fruit. If one chooses, a snap-on cap of durable material is provided to use the picker in a take-down manner where only a few fruit are desired at one picking.

OPERATION—FIGS. 1-5

To operate the picker it is generally placed in a vertical position with the jaws closed. The cord 32 is temporarily attached to the pole 14 by half-hitches at a position near the bottom of the pole 14 in a medium taut condition as shown in the drawing 32, one hand grasps the pole, since the picker, FIG. 1, is very light that is sufficient. The other hand is available for the cord, when the delivery tube 26 is used, it could also grasp the said tube in a manner that further retards the fall of the fruit if thought necessary. When the cap 23 is used of course the picker must be taken down to collect the fruit. The picker is simply placed under the fruit. The cord is pulled, the picker advanced, and the cord is released. The jaws snap shut enclosing the fruit and down the tube it goes onto the ground or desirable receptacle.

SUMMARY, RAMIFICATIONS, AND SCOPE

My mechanical fruit picker can have a variety of different shapes, designs, materials and uses. It could be used to pick cherries or other small fruit by simply inserting an inner lining. This lining could be screen, paper, cloth or any of a number of materials. The picker could be used to gather fruit as large as grapefruit by manufacturing it in a larger size. It could be used to gather nuts such as walnuts, pecans, filberts, or persimmons. The picker can be constructed in a variety of different sizes to satisfy the different needs. It could be constructed in a number of different materials such as any of the plastics or any of the various metals, in variable colors.

As for the shape, the housing could be square, octagon or rectangular. As for the sides of housing it could be constructed with many different designs such as diagonal rods or more or less number and rods or with a different number of hoops.

The jaws could be shaped in many different ways. They could have square or rectangular cross sections or other shapes.

The control rod could be square or round with portions of each. The spring could be replaced by other types of flexible means such as rubber or any material that retracts when stretched. The bracket could be replaced by two loops one on each perimeter or other means to control and act as a guide for the control rod. The cloth tube for delivering the fruit could be made of any of a number of materials, or in sections. It could be coupled to the bottom perimeter of the housing by any method besides snap fasteners that provide a convenient and easy method. The same is true of the cap which provides a substitute method of picking. The cord could be substituted by a rod lever system.

I chose the system that is presented in the specification and drawing to present my application as a preferred choice.

As heretofore described, the reader will be able to see that the fruit picker described has many advantages over any that orchardists have had. My picker permits fruit to be separated from the tree at the joint that nature provided. It gives the operator excellent view. Since the sides are open, it does not have to be taken down with the delivery tube attached. One can hold the tube with a hand to cause it to purse more if the height warrants it and also free the other hand to hold the handle.

It eliminates the hazard of stepladders.

My fruit picker as heretofore described provides a picker that can pick fruit with a minimal effort. It delivers the fruit by gravity. The picker does not have to be taken down to deliver the fruit. It can be operated by elderly persons, children, or a person in a wheelchair, by holding the picker at waist level. No damage is incurred to the fruit or the parent tree. It causes less interference to twigs and branches of the tree. It is a sure-fired deliverer when it closes on the fruit. It has definite sight advantages. The durable material it is made of is long lasting. Its operating means is available at any level on the handle. My mechanical fruit picker with delivery system gives an easier access to the fruit because it is approached from the bottom. It is also much lighter since the fruit passes through the picker and does not add extra weight.

I claim:

1. A mechanically operated fruit picker that gathers fruit by means of jaws and a delivery system, take-down method, comprising:

a housing, tubular shaped with two ends, a top and bottom, with both ends open to serve as a fruit conduit and attachment means, a means to remove fruit, a pair of jaws, an inside and outside jaw, arched shaped, both jaws with hinge pins, mounted on the top perimeter of the housing so as to let the inside smaller jaw pass through the outside jaw in close proximity, a means to actuate jaws, a control rod with two ends, a top and bottom end, the said top end looped at 90° fitted around one side of the jaws, that activates through a bracket mounted vertically on the side of the housing directly under the side of a jaw pivot, a means to energize, a spring threaded around the rod and attached to the top of the bracket, and at a point near the bottom of the control rod, a support means, a pole mounted vertically to the housing, a means to operate a cord attached to the bottom of the control rod to pull open jaws, to release closes them, a delivery system, a tubular flexible cloth sleeve of undefined length equipped with snaps to attach to bottom perimeter of the housing, a take-down method by means of a shallow cap with snap fastener attached to the bottom perimeter of the housing.

* * * * *